(12) United States Patent
Terpstra et al.

(10) Patent No.: US 10,356,043 B2
(45) Date of Patent: *Jul. 16, 2019

(54) SYSTEMS AND METHODS FOR DYNAMICALLY REGISTERING ENDPOINTS IN A NETWORK

(71) Applicant: LEVEL 3 COMMUNICATIONS, LLC, Broomfield, CO (US)

(72) Inventors: Richard D. Terpstra, Superior, CO (US); Daryl W. Malas, Broomfield, CO (US)

(73) Assignee: Level 3 Communications, LLC, Broomfield, CO (US)

(*) Notice: Subject to any disclaimer, the term of this patent is extended or adjusted under 35 U.S.C. 154(b) by 7 days.

This patent is subject to a terminal disclaimer.

(21) Appl. No.: 15/837,983

(22) Filed: Dec. 11, 2017

(65) Prior Publication Data
US 2018/0167357 A1    Jun. 14, 2018

Related U.S. Application Data

(63) Continuation of application No. 11/009,204, filed on Dec. 9, 2004, now Pat. No. 9,843,557.

(51) Int. Cl.
*H04L 12/24*    (2006.01)
*H04L 29/06*    (2006.01)
(Continued)

(52) U.S. Cl.
CPC ........ *H04L 61/2589* (2013.01); *H04L 29/125* (2013.01); *H04L 41/5041* (2013.01);
(Continued)

(58) Field of Classification Search
CPC . H04L 65/1073; H04L 29/125; H04L 41/082; H04L 41/0886; H04L 41/0893;
(Continued)

(56) References Cited

U.S. PATENT DOCUMENTS 5,742,666 A    4/1998    Alpert
5,774,668 A    6/1998    Choquier et al.
(Continued)

FOREIGN PATENT DOCUMENTS

EP    1307018    5/2003
JP    10307783    11/1998
(Continued)

OTHER PUBLICATIONS

"Cisco DistributedDirector", Cisco Systems, Inc. 19969 pgs.
(Continued)

*Primary Examiner* — Ninos Donabed

(57) ABSTRACT

Various systems and methods for dynamically registering a communication device with a network are disclosed. As one example, a system is disclosed that includes a home feature server, a central feature server, and a floating feature server. The floating feature server is communicably coupled to at least the home and central feature servers, and the home feature server is communicably coupled to at least the central feature server. The home feature server is associated with a communication device. The floating feature server is communicably coupled to a computer readable medium that includes instructions executable by the floating feature server to: receive an access request from the communication device; issue a services request to the home feature server; and service the access request. Various other embodiments and/or features are also disclosed.

15 Claims, 8 Drawing Sheets

(51) Int. Cl.
*H04L 29/08* (2006.01)
*H04L 29/12* (2006.01)

(52) U.S. Cl.
CPC ...... *H04L 61/2564* (2013.01); *H04L 65/1073* (2013.01); *H04L 67/16* (2013.01)

(58) Field of Classification Search
CPC . H04L 41/28; H04L 41/5003; H04L 41/5041; H04L 41/5051; H04L 61/2564; H04L 61/2589; H04L 63/0263; H04L 63/20; H04L 67/1002; H04L 67/2814; G06Q 10/107
See application file for complete search history.

(56) References Cited

U.S. PATENT DOCUMENTS

| | | | |
|---|---|---|---|
| 5,812,769 A | 9/1998 | Graber et al. | |
| 5,819,092 A | 10/1998 | Ferguson et al. | |
| 5,920,701 A | 7/1999 | Miller et al. | |
| 5,956,716 A | 9/1999 | Kenner et al. | |
| 6,052,718 A | 4/2000 | Gifford | |
| 6,078,943 A | 6/2000 | Yu | |
| 6,081,835 A | 6/2000 | Antcliff | |
| 6,108,703 A | 8/2000 | Leighton et al. | |
| 6,112,239 A | 8/2000 | Kenner et al. | |
| 6,138,026 A | 10/2000 | Irvin | |
| 6,154,744 A | 11/2000 | Kenner et al. | |
| 6,167,427 A | 12/2000 | Rabinovich et al. | |
| 6,175,869 B1 | 1/2001 | Ahuja et al. | |
| 6,178,160 B1 | 1/2001 | Bolton et al. | |
| 6,185,601 B1 | 2/2001 | Wolff | |
| 6,185,619 B1 | 2/2001 | Joffe et al. | |
| 6,243,760 B1 | 6/2001 | Armbruster et al. | |
| 6,314,465 B1 | 11/2001 | Paul et al. | |
| 6,330,605 B1 | 12/2001 | Christensen et al. | |
| 6,374,299 B1 | 4/2002 | Ford et al. | |
| 6,412,002 B1 | 6/2002 | Denman et al. | |
| 6,412,004 B1* | 6/2002 | Chen ................ H04L 29/06027 709/203 |
| 6,438,652 B1 | 8/2002 | Jordan et al. | |
| 6,484,204 B1 | 11/2002 | Rabinovich | |
| 6,574,612 B1 | 6/2003 | Baratti et al. | |
| 6,601,084 B1 | 7/2003 | Bhaskaran et al. | |
| 6,606,643 B1 | 8/2003 | Emens et al. | |
| 6,636,499 B1 | 10/2003 | Dowling | |
| 6,665,702 B1 | 12/2003 | Zisapel et al. | |
| 6,678,357 B2 | 1/2004 | Stumer et al. | |
| 6,687,731 B1 | 2/2004 | Kavak | |
| 6,722,211 B1 | 4/2004 | Ciobanu et al. | |
| 6,757,266 B1 | 6/2004 | Hundscheidt | |
| 6,760,775 B1 | 7/2004 | Anerousis et al. | |
| 6,778,496 B1 | 8/2004 | Meempat et al. | |
| 6,795,858 B1 | 9/2004 | Jain et al. | |
| 6,845,092 B2 | 1/2005 | Vassilovski et al. | |
| 6,857,021 B1 | 2/2005 | Schuster et al. | |
| 6,886,035 B2 | 4/2005 | Wolff | |
| 6,938,031 B1 | 8/2005 | Zoltan et al. | |
| 6,963,557 B2 | 11/2005 | Knox | |
| 7,000,016 B1 | 2/2006 | Vanderbeck et al. | |
| 7,031,728 B2 | 4/2006 | Beyer, Jr. | |
| 7,076,541 B1 | 7/2006 | Burstein et al. | |
| 7,088,718 B1 | 8/2006 | Srivastava | |
| 7,103,645 B2 | 9/2006 | Leighton et al. | |
| 7,103,647 B2 | 9/2006 | Aziz | |
| 7,110,393 B1 | 9/2006 | Tripathi et al. | |
| 7,111,052 B1 | 9/2006 | Cook | |
| 7,136,651 B2 | 11/2006 | Kalavade | |
| 7,151,753 B2 | 12/2006 | Chaney | |
| 7,174,456 B1* | 2/2007 | Henry ................ H04L 63/0428 713/158 |
| 7,177,399 B2 | 2/2007 | Dawson et al. | |
| 7,194,552 B1 | 3/2007 | Schneider | |
| 7,248,891 B2 | 7/2007 | Charles | |
| 7,292,853 B2 | 11/2007 | Nam et al. | |
| 7,308,481 B2 | 12/2007 | Takamoto et al. | |
| 7,328,281 B2 | 2/2008 | Takeda et al. | |
| 7,333,459 B2 | 2/2008 | Feyerabend et al. | |
| 7,342,928 B2 | 3/2008 | Boulay et al. | |
| 7,379,458 B2 | 5/2008 | Inoue et al. | |
| 7,412,521 B2 | 8/2008 | Olson et al. | |
| 9,088,599 B2 | 7/2015 | Terpstra | |
| 2001/0042139 A1 | 11/2001 | Jeffords et al. | |
| 2002/0004402 A1* | 1/2002 | Suzuki ................ H04L 12/1895 455/456.6 |
| 2002/0031107 A1 | 3/2002 | Li | |
| 2002/0032777 A1 | 3/2002 | Kawata et al. | |
| 2002/0078209 A1 | 6/2002 | Peng | |
| 2002/0078263 A1 | 6/2002 | Darling et al. | |
| 2002/0098832 A1* | 7/2002 | Fleischer ............. H04M 3/487 455/414.1 |
| 2002/0141401 A1 | 10/2002 | Albert et al. | |
| 2002/0166117 A1 | 11/2002 | Abrams et al. | |
| 2002/0186844 A1* | 12/2002 | Levy ................ G06F 21/10 380/231 |
| 2002/0194335 A1 | 12/2002 | Maynard | |
| 2002/0194342 A1 | 12/2002 | Lu et al. | |
| 2003/0007622 A1 | 1/2003 | Kalmanek | |
| 2003/0009559 A1 | 1/2003 | Ikeda | |
| 2003/0012344 A1 | 1/2003 | Agarwal et al. | |
| 2003/0041238 A1 | 2/2003 | French et al. | |
| 2003/0050051 A1 | 3/2003 | Vilander | |
| 2003/0065761 A1 | 4/2003 | Cereja et al. | |
| 2003/0105865 A1 | 6/2003 | McCanne et al. | |
| 2003/0108000 A1 | 6/2003 | Chaney et al. | |
| 2003/0110257 A1 | 6/2003 | Hyun et al. | |
| 2003/0118011 A1 | 6/2003 | Wu | |
| 2003/0156577 A1 | 8/2003 | Dunlap et al. | |
| 2003/0195001 A1 | 10/2003 | Tari et al. | |
| 2004/0003084 A1 | 1/2004 | Malik | |
| 2004/0005884 A1* | 1/2004 | Nieminen ............. H04W 28/06 455/422.1 |
| 2004/0006647 A1* | 1/2004 | Kim ................ H04L 12/2803 709/249 |
| 2004/0044908 A1* | 3/2004 | Markham ........... H04L 63/0272 726/28 |
| 2004/0095938 A1 | 5/2004 | Ryu | |
| 2004/0113770 A1* | 6/2004 | Falk ................ G08B 13/19645 340/531 |
| 2004/0143662 A1 | 7/2004 | Poyhonen et al. | |
| 2004/0152469 A1 | 8/2004 | Yla-Outinen et al. | |
| 2004/0153525 A1 | 8/2004 | Borella | |
| 2004/0160947 A1 | 8/2004 | Hardy et al. | |
| 2004/0190497 A1 | 9/2004 | Knox | |
| 2004/0205192 A1 | 10/2004 | Olson et al. | |
| 2004/0264481 A1 | 12/2004 | Darling et al. | |
| 2005/0010653 A1 | 1/2005 | McCanne | |
| 2005/0015492 A1* | 1/2005 | Kumbalimutt ...... H04L 67/1006 709/226 |
| 2005/0022203 A1 | 1/2005 | Zisapel et al. | |
| 2005/0044141 A1 | 2/2005 | Hameleers et al. | |
| 2005/0055435 A1 | 3/2005 | Gbadegesin et al. | |
| 2005/0071279 A1* | 3/2005 | Asano ................ G06F 21/10 705/57 |
| 2005/0085257 A1 | 4/2005 | Laird et al. | |
| 2005/0091307 A1* | 4/2005 | Venkatsubra ..... H04L 29/06027 709/203 |
| 2005/0091407 A1 | 4/2005 | Vaziri et al. | |
| 2005/0101327 A1 | 5/2005 | Nam et al. | |
| 2005/0136925 A1 | 6/2005 | Yamauchi | |
| 2005/0169438 A1 | 8/2005 | Binning | |
| 2005/0197767 A1 | 9/2005 | Nortrup | |
| 2005/0213716 A1 | 9/2005 | Zhu et al. | |
| 2005/0233728 A1 | 10/2005 | Karaoguz et al. | |
| 2006/0013147 A1 | 1/2006 | Terpstra et al. | |
| 2006/0056388 A1 | 3/2006 | Livingood | |
| 2006/0064478 A1 | 3/2006 | Sirkin | |
| 2006/0069776 A1 | 3/2006 | Shim et al. | |
| 2006/0112170 A1 | 5/2006 | Sirkin | |
| 2006/0235980 A1 | 10/2006 | Pote et al. | |
| 2006/0265467 A1 | 11/2006 | Jang | |
| 2007/0254625 A1 | 11/2007 | Edge | |
| 2009/0070406 A1 | 3/2009 | Terpstra et al. | |

(56) References Cited

U.S. PATENT DOCUMENTS

| | | |
|---|---|---|
| 2010/0248683 A1 | 9/2010 | Terpstra |
| 2012/0243466 A1 | 9/2012 | Hagens |
| 2013/0060941 A1 | 3/2013 | Terpstra et al. |
| 2015/0156320 A1 | 6/2015 | Hagens et al. |
| 2015/0312741 A1 | 10/2015 | Terpstra |
| 2016/0021176 A1 | 1/2016 | Terpstra et al. |
| 2018/0295183 A1 | 10/2018 | Terpstra et al. |

FOREIGN PATENT DOCUMENTS

| | | |
|---|---|---|
| WO | WO-199857275 A3 | 12/1998 |
| WO | WO-199940514 | 8/1999 |
| WO | WO-2001/52497 A2 | 7/2001 |
| WO | WO-2003105439 | 12/2003 |

OTHER PUBLICATIONS

European Examination Report, dated Feb. 9, 2016, Application No. 06717386.4, filed Jan. 3, 2006; 4 pgs.

European Examination Report, dated Oct. 25, 2017, Application No. 06717386.4, filed Jan. 3, 2006; 3 pgs.

European Examination Report, dated Sep. 19, 2012, Application No. 05744499.4, 5 pgs.

European Search Report dated May 17, 2011, counterpart European Application No. 05744499.4, 5 pgs.

European Supplementary Search Report dated Feb. 2, 2011, counterpart European Application No. 05744499.4, 4 pgs.

Extended European Search Report, dated Sep. 24, 2013, Application No. 06717386.4 filed Jan. 3, 2006; 6 pgs.

International Searching Authorit, U.S. Patent and Trademark Office and Receiving Office, International Search Report (Form PCT/ISAI210) for international application No. PCT/US05/15260 dated Oct. 27, 2005 3 pgs.

International Searching Authority, US Patent and Trademark Office and Receiving Office, Written Opinion of the International Searching Authority (Form PCT/ISA/237) for international application No. PCT/US05/15260 10/27/20053 pgs.

"NAT Traversal and VoIP: The Challenge to Peer-to-Peer Internel Communication", retrieved at hltp'//msdn.microsoft.com/en-us/librarylbb330896 (Printer) aspxon Jul. 8, 2008 Microsoft Corporation 3/24/200811.

"U.S. Appl. No. 13/336,813, filed Dec. 23, 2011", "Registration Redirect Server" 40 pgs.

Almeroth, K. et al., "Scalable Delivery of Web Pages Using Cyclic Best-Effort (UDP) Multicast", *IEEE INFOCOM* San Francisco, California, USA Jun. 1998pp. 1-24.

Baentsch, M. et al., "Introducing Application-Level Replication and Naming into Today's Web", *Computer Networks and ISDN Systems* vol. 28, Nos. 7-11 May 1996pp. 921-930.

Berners-Lee, T. et al., RFC 1738—Uniform Resource Locators Dec. 1994pp. 1-25.

Berners-Lee, T. et al., "Hypertext Markup Language—2.0", Internet Engineering Task Force (IETF) Request for Comments (RFC) 1866 Nov. 1995pp. 1-77.

Berners-Lee, T. et al., "Hypertext Transfer Protocol—HTTP/1.0", Internet Engineering Task Force (IETF) Request for Comments (RFC) 1945 May 1996pp. 1-60.

Berners-Lee, T. et al., "Hypertext Transfer Protocol—HTTP/1.0", Internet Engineering Task Force (IETF), Internet Draft, draft-ietf-http-v10-spec-00.ps Mar. 1995pp. 1-59.

Berners-Lee, T. "Univeral Resource Identifiers in WWW: A Unifying Syntax for the Expression of Names and Addresses of Objects on the Network as Used in the World-Wide Web", Internet Engineering Task Force (IETF) Request for Comments (RFC) 1630 Jun. 1994pp. 1-28.

Bestavros, A. "Demand-Based Document Dissemination to Reduce Traffic and Balance Load in Distributed Information Systems", In Proc. IEEE Symp. on Parallel and Distributed Processing, San Antonio, TX Oct. 19958 pgs.

Bhattacharjee, S. et al., "Application-Layer Anycasting", in Proc. IEEE INFOCOM '97 Apr. 19979 pgs.

Brisco, T. "DNS Support for Load Balancing", IETF RFC 1794 Apr. 1995pp. 1-7.

Callon, R. "Use of OSI-IS for Routing in TCP/IP and Dual Environments", Internet Engineering Task Force (IETF) Request for Comments (RFC) 1195 Dec. 1990pp. 1-85.

Chandra, R. et al., "BGP Communities Attribute", Internet Engineering Task Force (IETF) Request for Comments (RFC) 1997 Aug. 1996pp. 1-5.

Chen, E. et al., "An Application of the BGP Community Attribute in Multi-home Routing", Internet Engineering Task Force (IETF) Request for Comments (RFC) 1998 Aug. 1996pp. 1-9.

Colajanni, M. et al., "Scheduling Algorithms for Distributed Web Servers", Intl Conf. on Distributed Computing Systems (ICDCS), Baltimore, Maryland, USA May 1997pp. 169-176.

Collins, A. "The Detour Framework for packet Rerouting", University of Washington; http://web.archive.org/web/19990202122310/http://www.cs/washington.edu/research/networking/detour/ Oct. 29, 1998pp. 1-20.

Eriksson, H. "MBONE: The Multicast Backbone", *Communications of the ACM* vol. 37, No. 8 Aug. 1994pp. 54-60.

Fielding, R. et al., "Hypertext Transfer Protocol—HTTP/1.1", Internet Engineering Task Force (IETF) Internet Draft, draft-ietf-http-v11-spec-00.txt Nov. 1995pp. 1-81.

Fielding, R. et al., "Hypertext Transfer Protocol—HTTP/1.1", Internet Engineering Task Force (IETF) Request for Comments (RFC) 2068 Jan. 1997pp. 1-162.

Malkin, G. "RIP Version 2 Carrying Additional Information", Internet Engineering Task Force (IETF) Request for Comments (RFC) 1388 Jan. 1993pp. 1-7.

Mockapetris, P. "Domain Names—Concepts and Facilities", IETF RFC 1034 Nov. 198755 pgs.

Mockapetris, P. "Domain Names—Implementation and Specification", IETF RFC 1035 Nov. 198755 pgs.

Moy, J. "OSPF Version 2", Internet Engineering Task Force (IETF) Request for Comments (RFC) 1583 Mar. 1994132 pgs.

Parris, C. et al., "A Dynamic Connection Management Scheme for Guaranteed Performance Services in Packet-Switching Integrated Services Networks", UC Berkeley Computer Science Division Tech. Report TR-93-005 199337 pgs.

Partridge, C. et al., "Host Anycasting Service", Internet Engineering Task Force (IETF) Request for Comments (RFC) 1546 Nov. 1993pp. 1-9.

Rekhter, Y. et al., "A Border Gateway Protocol 4 (BGP-4)", Internet Engineering Task Force (IETF) Request for Comments (RFC) 1771 Mar. 1995pp. 1-57.

Rekhter, Y. et al., "Application of the Border Gateway Protocol in the Internet", Internet Engineering Task Force (IETF) Request for Comments (RFC) 1772 Mar. 1995pp. 1-19.

Savage, S. et al., "Detour: Informed Internet Routing and Transport", *IEEE Micro* vol. 19, No. 1 Jan-Feb 1999pp. 1-10.

Schemers, R. "Ibnamed: A Load Balancing Name Server in Perl", 1995 LISA IX Monterey, California Sep. 1995pp. 1-12

Topolcic, C. "Experimental Internet Stream Protocol, Version 2 (ST-II)", Internet Engineering Task Force (IETF) Request for Comments (RFC) 1190 Oct. 1990pp. 1-148.

Touch, J. et al., "The X-Bone", Third Global Internet Mini-Conference at Globecom '98, Sydney, Australia (pp. 44-52 of mini-conference) Nov. 1998pp. 59-68.

Traina, P. "BGP-4 Protocol Analysis", Internet Engineering Task Force (IETF) Request for Comments (RFC) 1774 Mar. 1995pp. 1-10.

Traina, P. "Experience with the BGP-4 Protocol", Internet Engienering Task Force (IETF) Request for Comments (RFC) 1773 Mar. 1995pp. 1-9.

Wessels, D. et al., "Application of Internet Cache Protocol (ICP), Version 2", Internet Engineering Task Force (IETF) Request for Comments (RFC) 2187 Sep. 1997pp. 1-24.

Wessels, D. et al., "Internet Cache Protocol (ICP), Version 2", Internet Engineering Task Force (IETF) Request for Comments (RFC) 2186 Sep. 1997pp. 1-9.

\* cited by examiner

SYSTEMS AND METHODS FOR DYNAMICALLY REGISTERING ENDPOINTS IN A NETWORK

CROSS-REFERENCE TO RELATED APPLICATION

The present application is a continuation of and claims the benefit of priority from U.S. patent application Ser. No. 11/009,204, entitled "SYSTEMS AND METHODS FOR DYNAMICALLY REGISTERING ENDPOINTS IN A NETWORK," filed Dec. 9, 2004, the entire contents of which are fully incorporated by reference herein for all purposes.

BACKGROUND OF THE INVENTION

The present invention provides systems and methods for servicing network access requests. More particularly, the present invention provides systems and methods for servicing network access requests issued by a communication device to a Voice over Internet Protocol network.

In non-traditional telecommunications systems, services are provided via a feature server provisioned to accept access from a particular communication device. In some cases, the provisioned feature server will become inoperable due to a failure of the feature server. When such a failure occurs, the services provided to the communication device may be unavailable or severely limited. Similarly, network access to the feature server may become so congested that the quality of response from the provisioned feature server may be limited.

Hence, there exists a need in the art for advanced systems and methods for offering telecommunication services.

BRIEF SUMMARY OF THE INVENTION

The present invention provides systems and methods for servicing network access requests. More particularly, the present invention provides systems and methods for servicing network access requests issued by a communication device to a Voice over Internet Protocol network.

Various embodiments of the present invention provide systems and methods for dynamically assigning a feature server for use by a particular communication device. Thus, the communication device need not necessarily access a network by an assigned feature server. Such an approach may provide, among other things, an ability to avoid network congestion and/or device failures.

Some embodiments of the present invention provide methods for dynamically provisioning feature server access in a communication network. The methods include periodically updating a network service resource list. The network service resource list indicates one or more feature servers accessible by a load balancer. Registration requests are received, and an indication of at least one feature server from the network service resource list is provided in response to the registration request. Such registration requests can be issued by a TA and/or communication device. In some cases, the indicated feature server can be used by a communication device to access the network.

In various cases, the network service resource list includes a number of feature servers presented in an ordered list. The order of the ordered list can indicate, for example, preferential access order, costs, loading, quality of service, and/or the like. Further, in some cases a list of available network resources is provided in response to the registration request. This list includes the indicated feature server provided in response to the registration request. This list of available network resources can be a subset of the network service resource list, and can be provided as an ordered list. Similarly, the order of the ordered list can indicate one or more preferences including, but not limited to, preferential access order, costs, loading, quality of service, and/or the like. In some cases, this list of available network resources is also referred to as a network resource list.

In various instances, the feature servers in the network service resource list includes pairs of NAT traversal managers and feature servers. These pairs may include pairing between feature servers and NTMs that are one to one, one to many, and/or many to many Thus, for example, one feature server may be paired with only one NAT traversal manager, or two or more NAT traversal managers. Similarly, one NAT traversal manager may be paired with only one feature server, or with two or more feature servers. In such cases, the indicated feature server is identified in relation to an associated NAT traversal manager.

In some cases, two or more feature servers on the network service resource list are clustered. Such clustering is found where a database is commonly accessible by two or more feature servers. One of the feature servers may be a home feature server associated with a communication device issuing the registration request, and another of the feature servers may be a central feature server.

In some cases when a network access request is received from the communication device, the receiving feature server accesses a database associated with the home feature server using a services request. Where the receiving feature server and home feature server are clustered, the database access may be performed without accessing the home feature server, while in other cases the home feature server is accessed. Where the access to the home feature server fails, the receiving feature server may issue another services request to the central feature server.

Other embodiments of the present invention provide methods for dynamically registering a communication device with a communication network. The methods include issuing a registration request to a load balancer. In response to the registration request, a network service resource list is received which indicates one or more feature servers. In addition, one of the feature servers from the network service resource list is accessed. In some cases, the network service resource list includes NAT traversal manager and feature server pairs. In such a case, accessing the feature server includes accessing the associated NAT traversal manager. In various cases, the methods include accessing another NAT traversal manager and feature server pair when a preceding access to another pair fails.

Yet other embodiments of the present invention provide systems for facilitating dynamic network access requests. Such systems include a home feature server, a central feature server, and a floating feature server. The floating feature server is communicably coupled to at least the home and central feature servers, and the home feature server is communicably coupled to at least the central feature server. The home feature server is associated with a communication device. The floating feature server is communicably coupled to a computer readable medium that includes instructions executable by the floating feature server to: receive an access request from the communication device; issue a services request to the home feature server; and service the access request. In some cases, the computer readable medium further includes instructions executable to determine that the first services access request failed, and to issue a second services access request to the central feature server.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
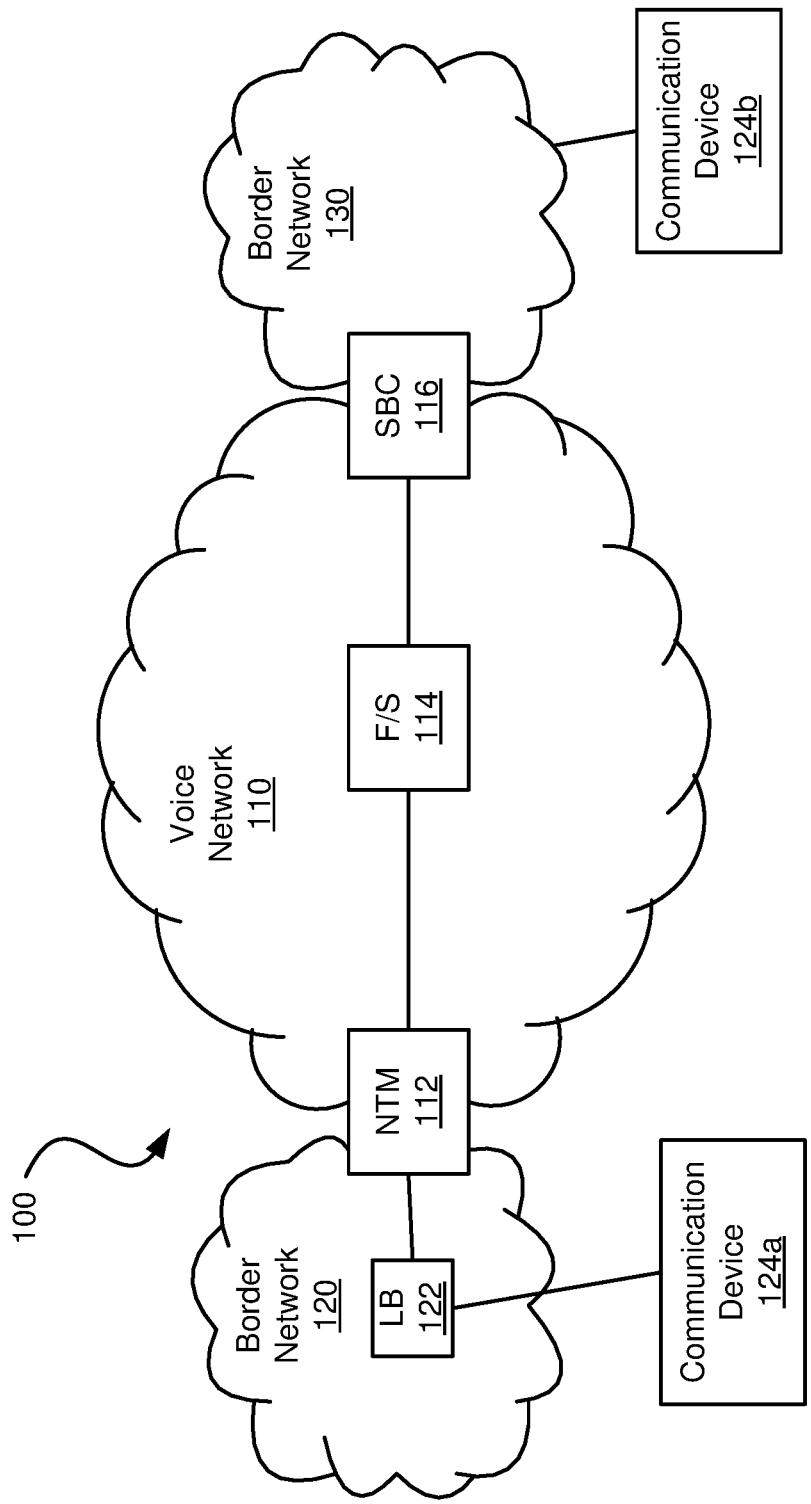
FIG. 1A depicts a communication network in accordance with some embodiments of the present invention.

The present invention provides systems and methods for servicing network access requests. More particularly, the present invention provides systems and methods for servicing network access requests issued by a communication device to a Voice over Internet Protocol network.

Various embodiments of the present invention provide for dynamically registering a communication device or terminal adapter ("TA") with a feature server. As used herein the term "communication device" is used in its broadest sense to mean any device operable to communicate information. Thus, for example, a communication device can be a TA, a dial up modem, a broadband modem, an IAD associated with a public branch exchange, an IP phone, combinations thereof, and/or the like. In the document the terms TA and communication device can generally be used interchangably. In some cases, a TA uses a DNS to find a load balancer. The load balancer redirects the TA to a NAT traversal manager ("NTM"). Behind the NTM, there could be another load balancer that directs a registration request to a particular feature server or cluster of feature servers. In some cases, the particular feature server is a home feature server (e.g., home switch) for the TA. In the event that the TA roams to another location or in the event that the load balancer directs the TA to another feature server because of network congestion or failure, the feature server receiving the registration request (e.g. floating or visiting feature server) may load the subscriber information for the TA and notify the home feature server that the feature server receiving the registration request is now supporting the TA. The network may try to communicate with the TA via the home feature server. In such a situation, the home feature server may redirect the network to the feature server that received the registration request. Using such an approach, a communication device or TA is not limited to accessing the network by predefined feature servers, but can rather register with the network and be provisioned with any of a number of feature servers. In some cases, the systems and methods of the present invention can provide higher reliability and allow for a more efficient form of communication device roaming. Further, in various cases, the systems and methods of the present invention can provide a mechanism for doing congestion control in the network. Based on the disclosure provided herein, one of ordinary skill in the art will recognize a number of other advantages that can be achieved using systems and methods in accordance with embodiments of the present invention.

Some embodiments of the present invention provide systems and methods for dynamically provisioning feature server access in a communication network. As used herein, the term "communication network" encompasses any network capable of transmitting information from one entity to another. In one particular case, a communication network is a Voice over Internet Protocol network. Some of the systems and methods of the present invention include periodically updating a network service resource list. As used herein, the term "network resource list" is used in its broadest sense to be a list of any resources available in a network. In one particular case, the network resource list indicates one or more feature servers accessible to a load balancer and/or a communication device. In some cases, the network resource list includes pairs of NAT traversal managers and feature servers accessible to the load balancer and/or communication device. The feature servers described on the network resources list can be floating feature servers, home feature servers, and/or central feature servers as more fully set forth below. In some cases, these feature servers are described as communicably coupled one with another, or communicably coupled with other network devices. For the purposes of this document, the term "communicably coupled" is used in its broadest sense to mean coupling in any fashion that allows information to be passed between network devices. Thus, for example, communicably coupled devices can be coupled either directly or indirectly. Further, communicably coupled devices can be, for example, electrically coupled, optically coupled, wirelessly coupled, and/or physically coupled.

Turning to FIG. 1, a communication network 100 and an exemplary non-traditional communication device 124 useful in accordance with some embodiments of the present invention are illustrated. Communication network 100 includes a voice network 110 with one or more feature servers 114, one or more NTMs 112, and one or more session border controllers ("SBC"). Feature server 114 is operable to provide one or more telecommunications services supported by voice network 110. For example, feature server 114 may provide caller identification, call forwarding, voice mail, and/or the like. In one particular case, feature server 114 is a Class-5 soft switch. Session border controller 116 and NTM 112 are responsible for receiving and sending communications to/from voice network 110. Thus, as illustrated, NTM 112 is responsible for passing communications between a border network 120 and voice network 110. Similarly, session border controller 116 is responsible for passing communications between voice network 110 and border network 130.

As illustrated, border network 120 includes one or more load balancers 122, and is communicably coupled to one or more communication devices 124*a*. Communication devices 124 are also referred to herein as terminal adapters ("TA"). For purposes of this document, a terminal adapter/communication device can be a stand alone adapter capable of interfacing a telephone or other communication equipment to border networks 120, 130 or directly to voice network 110. Alternatively, a terminal adapter/communication device can be incorporated in a more complex communication equipment. Thus, for example, the terminal adapter may be part of a personal computer, a SIP phone, an analog phone, and/or the like. Also illustrated is another communication device 124*b* communicably coupled to another border network 130.

In a typical scenario, communication device 124*a* registers with voice network 110. This can begin by accessing load balancer 122 which dynamically directs the registration request to a feature server 114 via an NTM 112. Once communication device 124*a* is registered, it can be used to make calls via voice network 110. A call is initiated by sending a call request to a feature server 114 via an NTM 112 as assigned during the registration request. In turn, feature server 114 directs the telephone call to another communication device 124*b* via session border controller 116. In this way voice and/or other communication service can be provided between communication devices 124. Based on the disclosure provided herein, one of ordinary skill in the art will recognize other information in addition to voice that can be passed between communication devices. For example, data, video, and other information can also be passed. Further, based on the disclosure provided herein, one of ordinary skill in the art will recognize that more than IP to IP communications can be handled by systems in accordance with embodiments of the present invention. For example, a call or other communication can exit voice network 110 to an IP endpoint or to a PSTN. Thus, it should be recognized that border network 130 can be different types of networks including, but not limited to, an IP network coupled to voice network 110 via SBC 116, or a PSTN network coupled to voice network 110 via a TDM gateway (not shown).

Figure 1B:
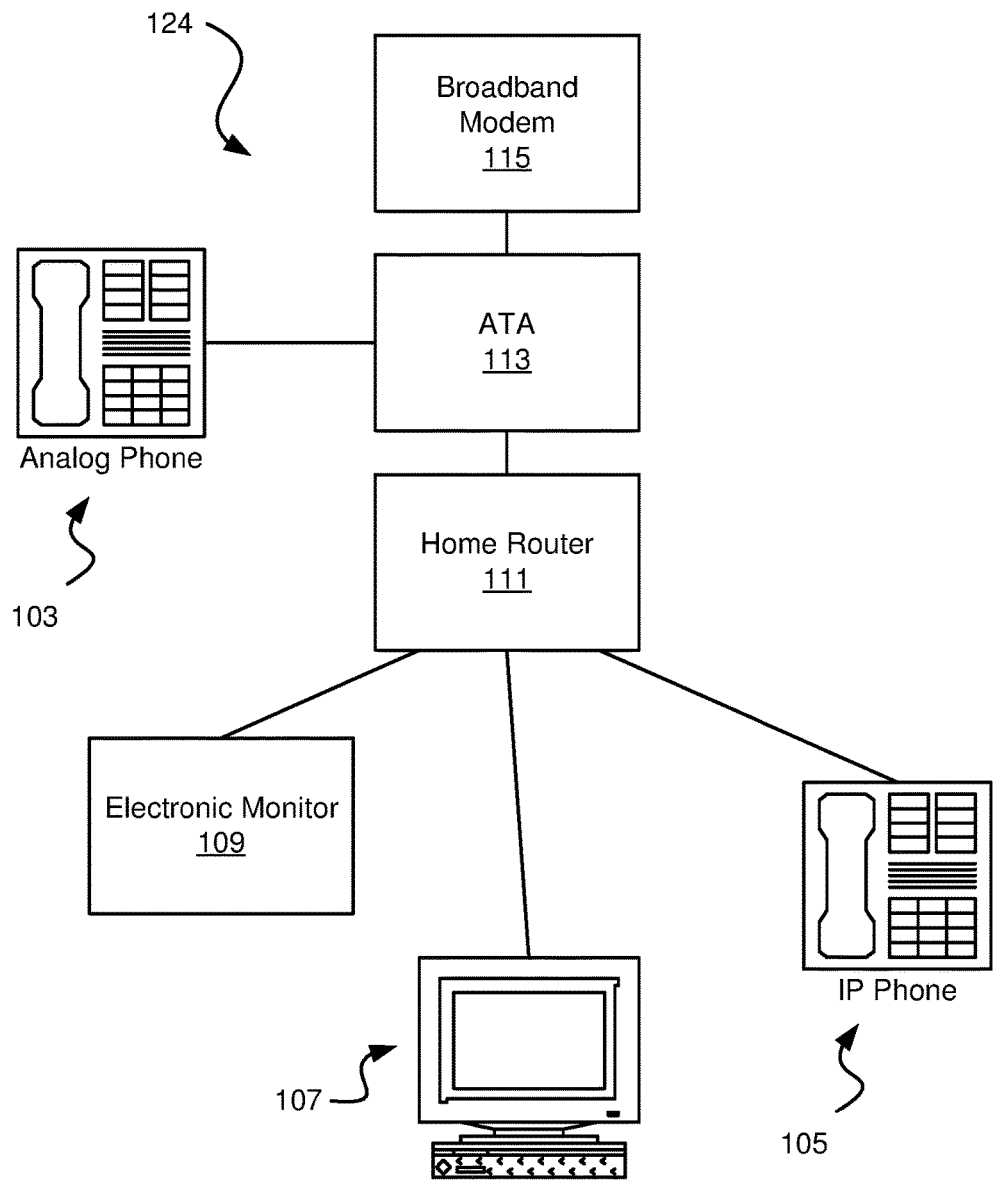
FIG. 1B depicts an exemplary non-traditional communication device for a network in accordance with some embodiments of the present invention.

Turning to FIG. 1B, an exemplary configuration of a compound, non-traditional communication device 124 useful in relation to embodiments of the present invention is illustrated. Non-traditional communication device 124 includes a broadband modem 115 capable of coupling to a public Internet or other border network, an Analog Terminal Adapter ("ATA") 113 capable of attaching a traditional analog telephone 103 to broadband modem 115, and a home router 111 capable of allowing access for one or more communication devices to broadband modem 115. Such communication devices can be, for example, an electronic monitor 109, a personal computer 107, and an IP telephone 105. Electronic monitor 109 may be any device or system capable of monitoring a defined set of events and reporting on that set of events. Thus, for example, electronic monitor 109 can be a home security system or a patient health status monitoring system. Such systems may be capable of automatically initiating calls and thereafter transmitting various information. In one particular case the system may monitor patient health status or home security status. When a particular status is recognized, an emergency call can be initiated, and information relevant to the emergency can be transmitted. Based on the disclosure provided herein, one of ordinary skill in the art will recognize a number of electronic monitoring equipment that can be associated with non-traditional communication device 124, and a number of situations that can be monitored by such devices.

It should be noted that the configuration is merely exemplary and that many configurations can be used in relation to embodiments of the present invention. For example, PC 107 may connect directly to broadband router 115, and in some cases, broadband router 115 may be replaced by a dial up modem. Alternatively, IP phone 105 may include a broadband modem capable of coupling directly to a border or other network. Based on the disclosure provided herein, one of ordinary skill in the art will recognize a number of other configurations and/or equipment either apart or in combination that can serve the function of non-traditional communication device 124.

Figure 2:
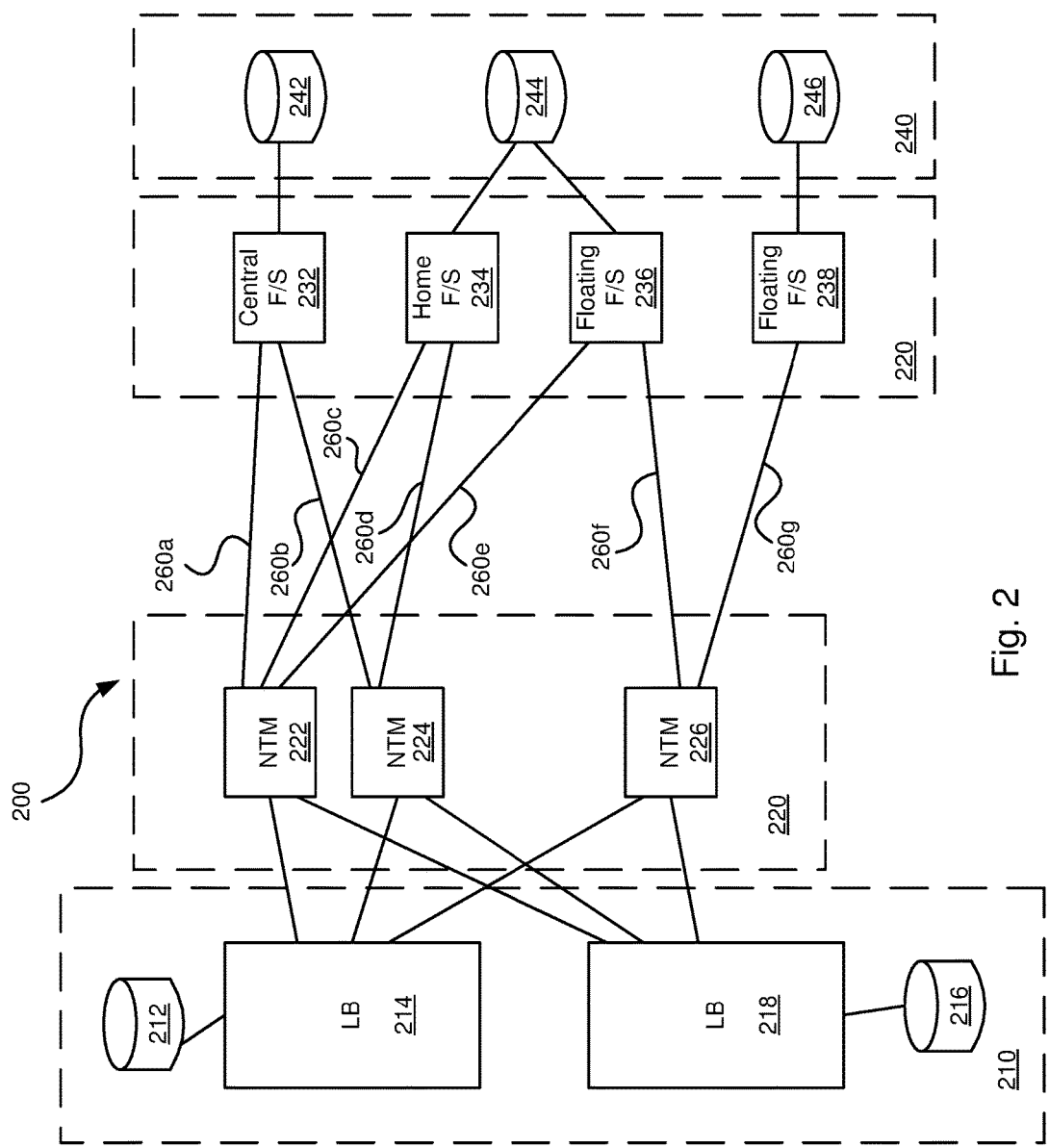
FIG. 2 depicts a system in accordance with various embodiments of the present invention.

Turning to FIG. 2, a system 200 capable of dynamically provisioning feature server access in accordance with one or more embodiments of the present invention is illustrated. System 200 includes a load balancer group 210, an NTM group 220, a feature server group 230, and a telecommunication service database group 240. Load balancer group 210 includes one or more load balancers 214, 218 respectively associated with load balancer caches 212, 216 as are known in the art. In particular, load balancers 214, 218 and load balancer caches 212, 216 can be selected from those commercially available and presently deployed.

NTM group 220 includes one or more NTMs 222, 224, 226, and feature server group 230 includes one or more feature servers 232, 234, 236, 238. Feature servers 232, 234, 236, 238 and NTMs 222, 224, 226 are paired as indicated by routes 260. As illustrated, the following NTM and feature server pairs exist: (1) NTM 222 and feature server 232, (2) NTM 222 and feature server 234, (3) NTM 222 and feature server 236, (4) NTM 224 and feature server 232, (5) NTM 224 and feature server 234, (6) NTM 224 and feature server 236, (7) NTM 226 and feature server 236, and (8) NTM 226 and feature server 238. It should be understood that the pairs are merely illustrative and that many different NTM and feature server pairs can be utilized in accordance with embodiments of the present invention. For example, an NTM can be paired with only one feature server, or with many feature servers. Similarly, a feature server can be paired with only one NTM, or with a number of NTMs.

Feature server group 230 includes one or more floating feature servers 236, 238, a home feature server 234, and a central feature server 232. Each of theses feature servers are described from the perspective of a communication device. Thus, the feature server provisioned to support the communication device is home feature server 234, and central feature server 232 provides at least rudimentary network access where home feature server 234 is unavailable. In one particular case, feature server 232 is a database incorporated with database 242, and is not an actual feature server. Floating feature servers 236, 238 can be accessed by the communication device, but such feature servers may rely on one or both of home feature server 234 and central feature server 232 to service network requests originating from the communication device. It should be noted that one or both of floating feature servers 236, 238 can be provisioned to operate as a home feature server for another communication device. In such a situation, the feature would act as a floating feature server to one communication device, and as a home feature server to another communication device. In some cases, central feature server 232 can act as a floating feature server and/or a home feature server depending upon the configuration of system 200. In one particular case, the feature servers are class five soft switches specially tailored for operation in accordance with embodiments of the present invention. Further, it should be noted that when accessed by a communication device, a floating feature server can receive service information about the communication device, and can dynamically become the home feature server for the communication device.

Telecommunication service database group 240 includes one or more telecommunication service databases 242, 244, 246 associated with one or more feature servers. For example, as illustrated, telecommunication service database 242 is communicably coupled to central feature server 232. Access to telecommunication service database 242 is available by accessing central feature server 232. Similarly, telecommunication service database 246 is communicably coupled to floating feature server 238, and access thereto is available via floating feature server 238. In contrast, telecommunication service database 244 is communicably coupled to both home feature server 234 and floating feature server 236. Thus, telecommunication service database 244 may be accessed via both home feature server 234 and floating feature server 236. Because home feature server 234 and floating feature server 236 share access to a common database they are referred to as "clustered". Clustered feature servers may both be considered a home feature server, because both have access to the provisioning information useful in servicing a TA. Based on the disclosure provided herein, one of ordinary skill in the art will recognize that floating feature servers can be clustered with other floating feature servers, a home feature server, and/or a central feature server. Similarly, a home feature server or central feature server can be clustered with various other feature server types.

Turning to FIG. 3, a series of flow diagrams 300, 301, 302 illustrate a method for dynamically registering an endpoint with a voice network. Following flow diagram 300, it is determined if it is time to update a load balancer cache (block 305). As will be appreciated by one of ordinary skill in the art, a load balancer maintains some awareness of network loading and network equipment status. This information is maintained in a cache associated with the load balancer, and is used to direct network accesses in such a way that the network accesses succeed and network congestion is reduced. This information is periodically updated based on an timer associated with a particular load balancer, or some other event such as an external indication of network equipment failure. Thus, determining whether it is time to update the load balancer cache includes querying the timer or other external event. In some cases, it may be that the load balancer cache is updated immediately as network information becomes available.

Where it is determined that it is time to update the load balancer cache (block 305), the load balancer requests network status (block 307) and in turn receives status updates (block 309). These status updates are loaded into the load balancer cache (block 311). Where the load balancer cache is updated (blocks 307-311), or where the load balancer update period is not complete (block 305), it is determined whether a registration request is received from a TA (block 313). In some cases, such a registration request is received whenever a communication device is powered on or otherwise booted, and/or periodically based on a timer implemented in the communication device. This registration request is received by a load balancer that is responsible for directing the request.

Where a registration request is received (block 313), the load balancer receiving the request accesses its cache to determined whether the communication device accessed the load balancer in the recent past. Where the communication device did not access the load balancer in the recent past, the load balancer creates a record for the communication device which is maintained in the load balancer cache for at least some period of time. Alternatively, where the communication device is reflected in the load balancer cache, the load balancer accesses information about the communication device.

In addition, the load balancer retrieves an ordered list of NTM and feature server pairs via which the communication device can access the network (block 315). This ordered list of NTM and feature server pairs is then sent to the communication device (block 317), and the communication device stores the ordered list (block 319). The TA accesses the ordered list and selects the first NTM and feature server pair. The TA issues a network access request to the feature server indicated in the selected NTM and feature server pair using the NTM indicated in the selected NTM and feature server pair (block 321). Where no response is received from the selected NTM and feature server pair (block 323), the network access request is issued to the next NTM and feature server pair (block 321). This process (blocks 321, 323) is repeated until an NTM and feature server pair are successfully accessed. Once a feature server is successfully accessed (block 323), the feature server is used to complete the network access, and is used to complete other network accesses occurring until the next time the communication device registers with the network (block 313) and the ordered list of NTM and feature server pairs is updated (blocks 315, 317, 319).

Based on the disclosure provided herein, one of ordinary skill in the art will recognize that the ordered list need not necessarily be limited to NTM and feature server pairs. For example, in one or more embodiments of the present invention, the ordered list identifies only feature servers, and other mechanisms are used to determine which NAT traversal manager will be used to access a selected feature server. Alternatively, a number of feature servers and NAT traversal managers may be indicated without being paired. In such a case, the communication device would select one of the NAT traversal managers and one of the feature servers to support a network access. Further, any list provided need not necessarily be ordered, or where ordered the order can mean different things including, for example, potential quality of service, network congestion, access cost, and/or the like.

Figure 3A:
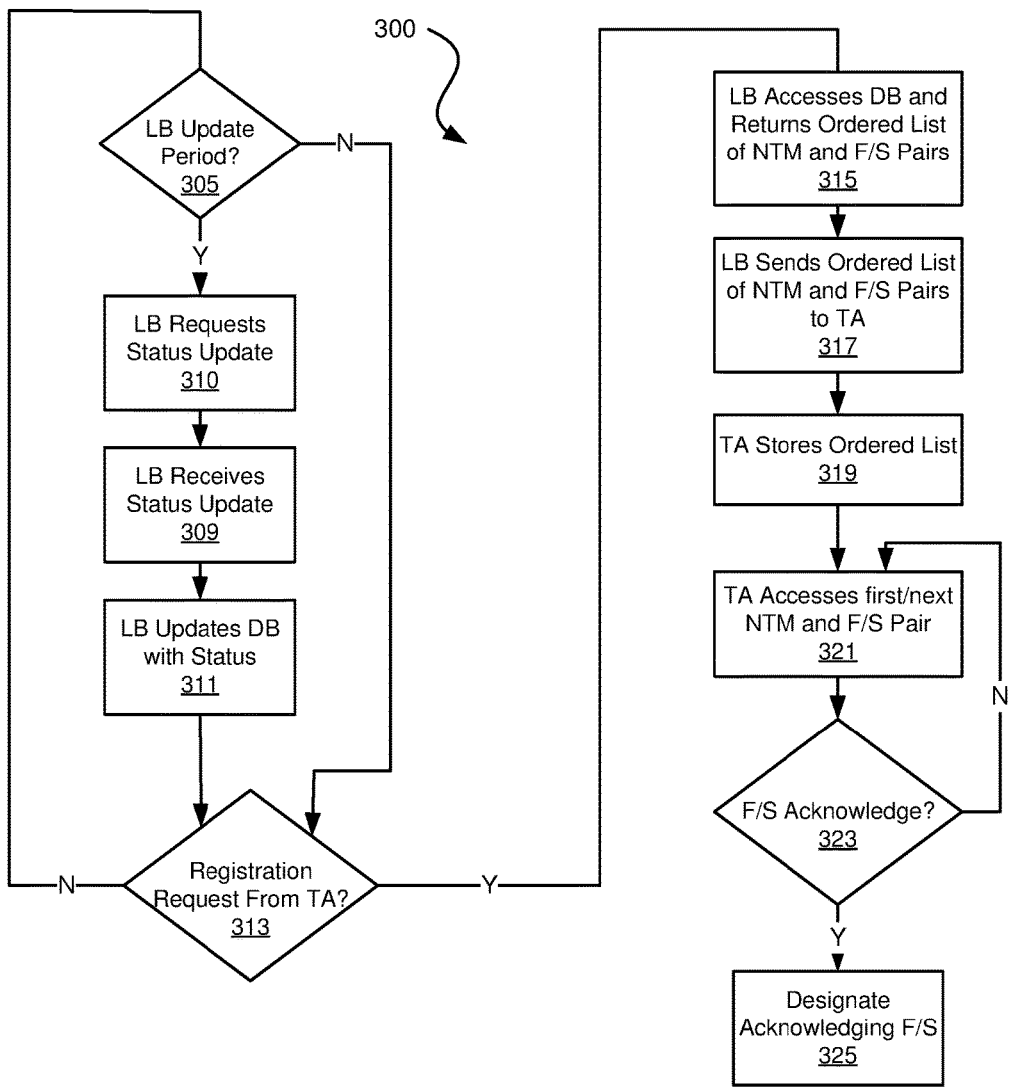
FIG. 3A depicts a method in accordance with one or more embodiments of the present invention for dynamically registering an endpoint with a network.
Figure 3B:
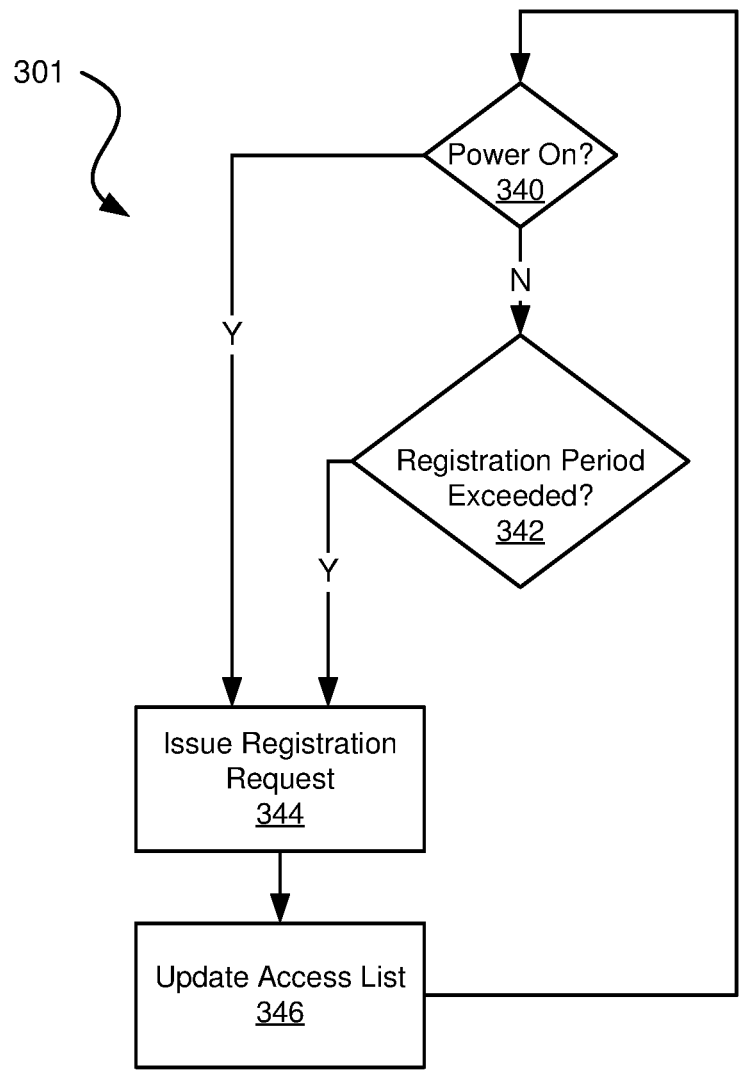
FIG. 3B depicts a method in accordance with various embodiments of the present invention for a registration process of an endpoint with a network from the perspective of a communication device.

Turning to FIG. 3B, a flow diagram 301 shows a registration process from the perspective of a communication device, and in accordance with various embodiments of the present invention. Following flow diagram 310, it is determined if a communication device has been powered on or otherwise booted (block 340) or whether a registration period has expired (block 342). Where either have occurred (blocks 340, 342), the communication device issues a registration request (block 344). In response, the communication device receives a list of network resources (i.e., an access list or a network resource list) which is maintained in a memory associated with the communication device (block 346).

Figure 3C:
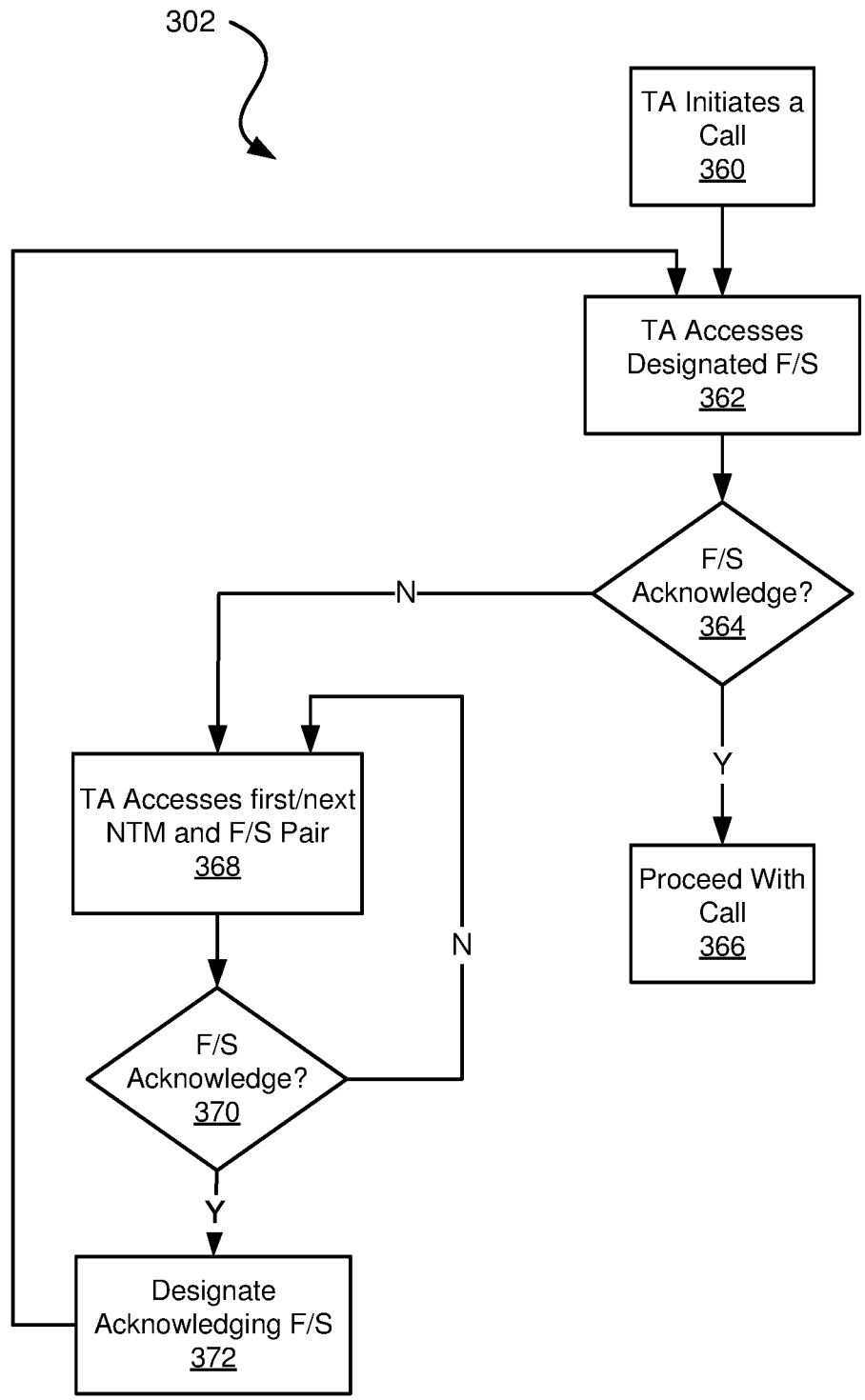
FIG. 3C depicts a method in accordance with various embodiments of the present invention for providing network access initiated from a telephone call.

Turning to FIG. 3C, a flow diagram 302 shows a network access which is, in this case, a telephone call from the perspective of a communication device. Following flow diagram 302, a communication device initiates a call (block 360). In initiating the call, the communication device sends a message including the originating phone number and the destination phone number to the designated feature server (block 362). Where the designated feature server is paired with a NAT traversal manager, the message is sent to the designated feature server via the paired NAT traversal manager. Where the feature server acknowledges the request (block 364), the call is processed by the feature server (block 366). As is known in the art, this call processing can include signaling the receiving communication device regarding the incoming call, and setting up a media path between the originating communication device and the receiving communication device. The media path is maintained until the call is completed.

Alternatively, where for some reason the accessed feature server fails to acknowledge the network access request (block 364), the communication device accesses the next NTM and feature server pair from the list of NTM and feature server pairs (block 368). Where the feature server from the NTM and feature server pair responds (block 370), the responding feature server is designated as the feature server to be used for servicing network accesses (block 372). Otherwise, the next NTM and feature server pair is identified from the network resource list and accessed (blocks 368, 370). This process continues until an available feature server is identified.

Once a feature server is designated (blocks 368, 370, 372), the communication device issues a network access request to the newly designated feature server (block 362). Where this newly designated feature server acknowledges the network request (block 364), it proceeds to service the network service request. Otherwise the process for identifying a feature server to service the request is repeated (blocks 368, 370, 372).

Figure 3D:
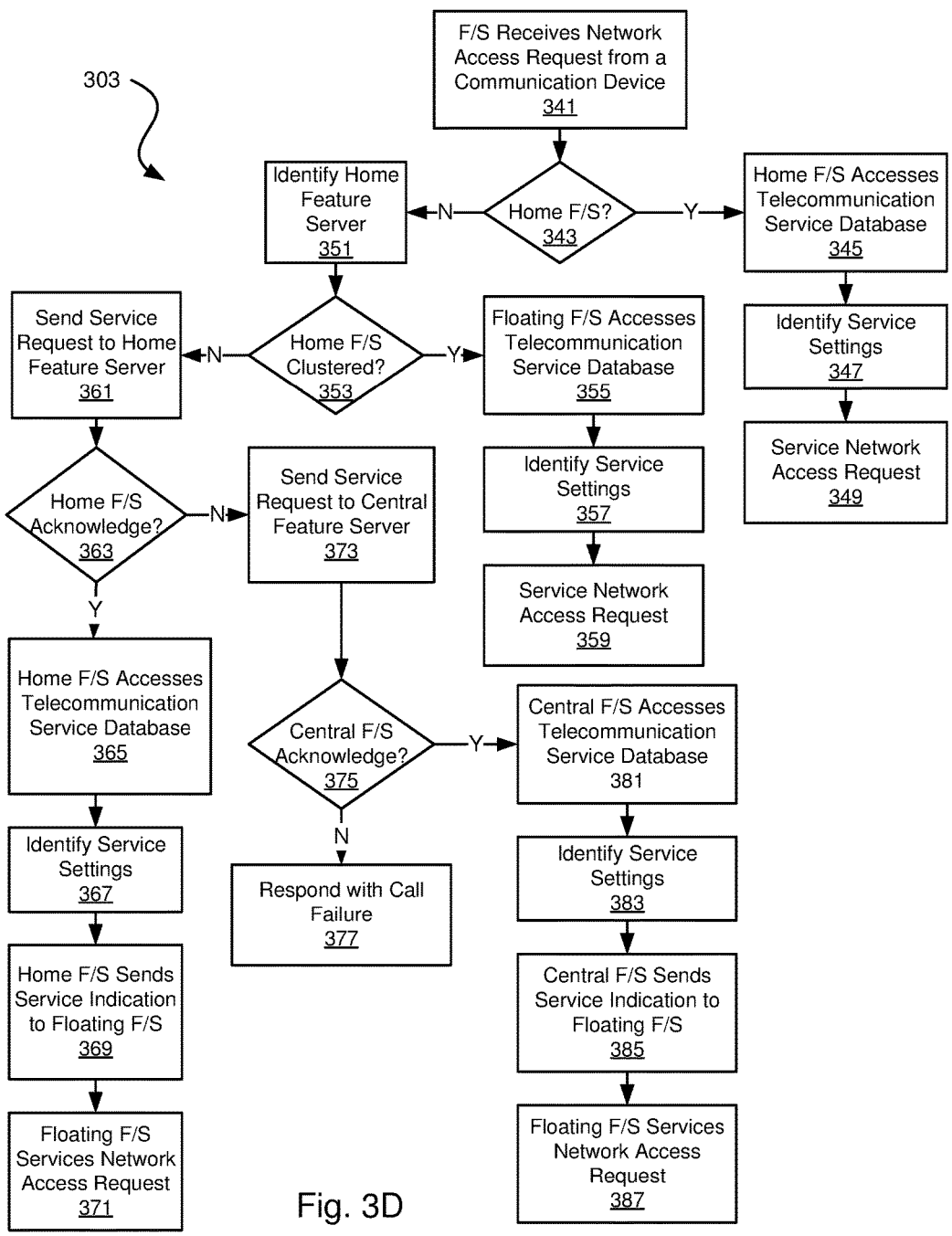
FIG. 3D depicts a method in accordance with various embodiments of the present invention for providing network access initiated from a registration request from an endpoint.

Turning to FIG. 3D, a flow diagram 303 shows a network access which, is in this case, a registration request from the perspective of the network servicing the call. Following flow diagram 303, a feature server receives a request to register a communication device (block 341). The receiving feature server determines whether it is the home feature server for the communication device initiating the request (block 343). Where the feature server is the home feature server (block 343), the feature server accesses the telecommunication service database associated with the feature server (block 345). By accessing the telecommunication service database (block 345), the feature server identifies service settings associated with the communication device (block 347). These service settings can indicate, among other things, the quality of service offered to the communication device and what services the communication device has authorized. The services can be, but are not limited to, voice mail, call forwarding, caller identification, multi-party calling, and/or the like. The feature server then proceeds to service the registration request. (block 349).

Alternatively, where it is determined that the feature server is not the home feature server (block 343), the feature server identifies the home feature server for the communication device (block 351). In this case the receiving feature server is a floating feature server and will seek out information regarding the communication device from the home feature server of the communication device. In particular, the floating feature server determines whether it is clustered with the home feature server (block 353). Where the floating feature server is clustered with the home feature server (block 353), the floating feature server accesses the telecommunication service database associated with the cluster including the home feature server (block 355). By accessing the telecommunication service database (block 355), the floating feature server identifies service settings associated with the communication device (block 357). Using these service settings, the floating feature server proceeds to service the request (block 359).

Where it is determined that the floating feature server is not clustered with the home feature server (block 353), a service request is sent to the identified home feature server (block 361). This service request queries for service settings about the communication device from the home feature server. The floating feature server waits for some period to determine if the home feature server will acknowledge the service request (block 363). Where the home feature server acknowledges the service request (block 363), the home feature server accesses the telecommunication service database associated with the home feature server (block 365), and identifies service settings associated with the communication device (block 367). The home feature server sends the identified service settings to the requesting floating feature server (block 369). Based on the received service settings, the floating feature server proceeds to service the request (block 371).

Where the home feature server does not acknowledge the service request from the home feature server (block 363), the service request is sent to a central feature server (block 373). In general, a central feature server will offer only rudimentary service settings capable of fulfilling a basic call or other network access request. Thus, where the home feature server fails to respond, the communication device may still be offered some level of service, albeit not the entire package usually enjoyed by the communication device. The floating feature server waits for some period to determine if the central feature server will acknowledge the service request (block 375). Where the central feature server acknowledges the service request (block 375), the central feature server accesses the telecommunication service database associated with the central feature server (block 381), and identifies service settings associated with the communication device (block 383). The central feature server sends the identified service settings to the requesting floating feature server (block 385), and based on the received service settings, the floating feature server proceeds to service the request (block 387). Alternatively, where the central feature server fails to acknowledge the service request (block 375), the call request fails (block 377). Failure of the call request can be indicated to the communication device by, for example, providing a particular dial tone to the communication device, and/or sending an error message to the communication device.

Figure 4:
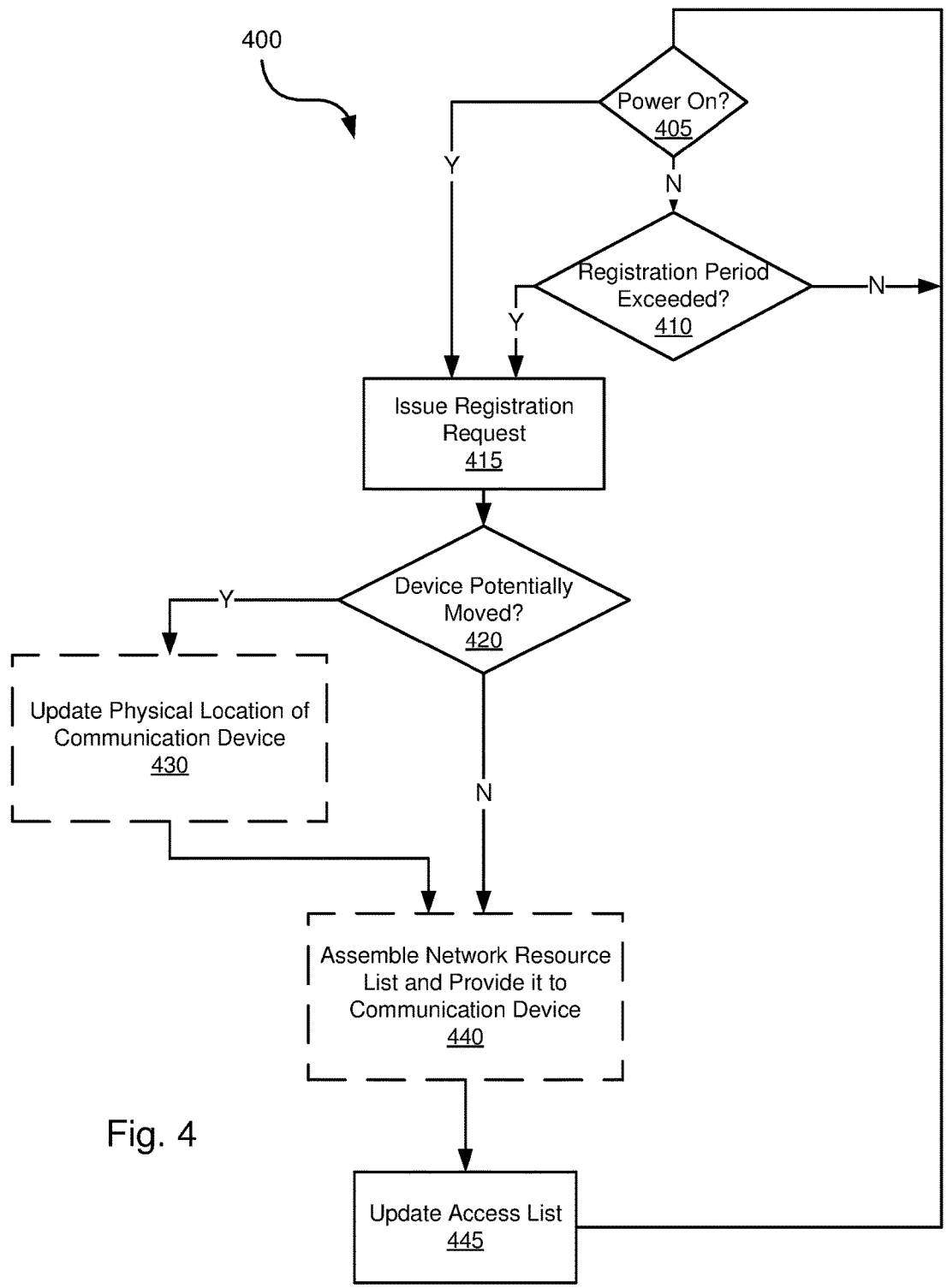
FIG. 4 is a flow diagram showing a method for identifying communication device location and dynamic registration of a communication device in accordance with various embodiments of the present invention.

Turning to FIG. 4, a flow diagram 400 shows a method for identifying communication device location and for dynamically registering a communication device in accordance with various embodiments of the present invention. Following flow diagram 400, it is determined if the communication device has recently powered on (block 405), or whether the registration period for the communication device has been exceeded (block 410). Where either of these conditions are met, the communication device issues a registration request to the network (block 415). It is then determined whether the communication device may have potentially moved since the last time it registered with the network (block 420). This can be done by determining whether the last network access by the communication device reported a different IP address for the communication device, or whether the communication device is accessing the network via a different load balancer than that used in a previous network access. These and other methods for determining the potential that a communication device has moved are more fully described in U.S. patent application Ser. No. 11/009,216 entitled "Systems and Methods for Locating Endpoints in a Communication Network", and filed by Hagens et al; and U.S. patent application Ser. No. 11/009,212 entitled "Systems and Methods for Providing Third Party Emergency Call Termination", and filed by Terpstra. Each of the aforementioned patent applications were previously incorporated herein by reference in their entirety.

Where it is determined that the communication device either moved or potentially moved (block 420), the physical location of the communication device is updated (block 430). This physical location information can be used to, among other things, dispatch emergency services in the event an emergency call is placed using the communication device. The process of updating the physical location of the communication device and for utilizing the updated physical location information is more fully described in U.S. patent application Ser. No. 11/009,216 entitled "Systems and Methods for Locating Endpoints in a Communication Network", and filed by Hagens et al; and U.S. patent application Ser. No. 11/009,212 entitled "Systems and Methods for Providing Third Party Emergency Call Termination", and filed by Terpstra. Again, the entirety of each of the aforementioned patent applications was previously incorporated herein by reference.

Where an update of the physical location of the communication device is either not warranted (block 420) or is completed (block 430), the communication device is dynamically registered with the network by assembling a network resource list and providing it to the communication device (bock 440). This can include one or more of the processes discussed above in relation to FIG. 3. An access list incorporating information for the network resource list is updated with the communication device (block 445).

In conclusion, the present invention provides novel systems, methods and arrangements for dynamically registering devices with a network. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for dynamically provisioning feature server access in a communication network, the method comprising:
   periodically updating a network service resource list, wherein the network service resource list is an ordered list of a plurality of feature servers and indicates at least one feature server accessible via a load balancer;
   receiving a registration request from a communication device;
   providing the network service resource list to the communication device in response to the registration request, wherein at least one feature server is selected from the ordered list;
   by the selected feature server:
      in response to receipt of a network access request issued by the communication device, determining whether the selected feature server is a home feature server associated with the communication device;
      based on a determination that the selected feature server is not the home feature server associated the communication device, determining whether the selected feature server is clustered with the home feature server;
      based on a determination that the selected feature server is not clustered with the home feature server, querying the home feature server for the one or more service settings associated with the communication device; and
      based on a determination that the selected feature server is clustered with the home feature server, accessing a database communicably coupled to a cluster comprising the home feature server and at least one of a floating feature server and a central feature server, wherein the database identifies one or more service settings associated with the communication device.

2. The method as recited in claim 1, wherein the at least one feature server is selected based at least in part upon a position in the ordered list.

3. The method as recited in claim 1, wherein the at least one feature server comprises a central feature server.

4. The method as recited in claim 1, wherein the at least one feature server comprises the home feature server associated with the communication device issuing the registration request.

5. The method as recited in claim 1, wherein the at least one feature server is paired with a NAT traversal manager.

6. The method as recited in claim 1, wherein the network service resource list further comprises a plurality of NAT traversal managers paired with the plurality of feature servers in the ordered list.

7. The method as recited in claim 6, wherein each of the plurality of NAT traversal managers are respectively paired with at least one of the plurality of feature servers.

8. A non-transitory computer readable medium encoded with instructions for dynamically registering a communication device with a communication network, the instructions executable by one or more processors to perform the steps of:
   by the communication device:
      issuing a registration request from the communication device to a load balancer;
      in response to the registration request, receiving a periodically updated network service resource list at the communication device, wherein the network service resource list comprises an ordered list of a plurality of feature servers compiled prior to receipt of the registration request by the load balancer;
      accessing the at least one feature server included on the ordered list of feature servers;
   by the accessed feature server:
      determining whether the accessed feature server is a home feature server associated with the communication device;
      based on a determination that the accessed feature server is not the home feature server associated the communication device, determining whether the accessed feature server is clustered with the home feature server;
      based on a determination that the accessed feature server is not clustered with the home feature server, querying the home feature server for the one or more service settings associated with the communication device; and
      based on a determination that the accessed feature server is clustered with the home feature server, accessing a database communicably coupled to a cluster comprising the home feature server and at least one of a floating feature server and a central feature server, wherein the database identifies one or more service settings associated with the communication device.

9. The non-transitory computer readable medium as recited in claim 8, wherein the network resource list further comprises a first NAT traversal manager and feature server pair and a second NAT traversal manager and feature server pair, and wherein the at least one feature server is included with the first NAT traversal manager and feature server pair, and wherein accessing the at least one feature server includes accessing a NAT traversal manager included in the first NAT traversal manager and feature server pair.

10. The non-transitory computer readable medium as recited in claim 8, wherein the at least one feature server is a first feature server; wherein the network resource list further comprises a first NAT traversal manager and feature server pair including a first NAT traversal manager and the first feature server, and a second NAT traversal manager and feature server pair including a second NAT traversal manager and the first feature server; and wherein accessing the at least one feature server includes accessing the first NAT traversal manager.

11. The non-transitory computer readable medium as recited in claim 8, wherein the at least one feature server is a first feature server; wherein the network resource list further comprises a first NAT traversal manager and feature server pair including a first NAT traversal manager and the first feature server, and a second NAT traversal manager and feature server pair including the first NAT traversal manager and a second feature server; and wherein accessing the at least one feature server includes accessing the first NAT traversal manger.

12. The non-transitory computer readable medium as recited in claim 8, wherein the at least one feature server is a first feature server; wherein the network resource list further comprises a first NAT traversal manager and feature server pair including a first NAT traversal manager and the first feature server, and a second NAT traversal manager and feature server pair including a second NAT traversal manager and a second feature server; and wherein accessing the at least one feature server includes accessing the first NAT traversal manager.

13. A system comprising:
at least one processor; and
memory, operatively connected to the at least one processor and storing instructions that, when executed by the at least one processor, cause the system to perform a set of operations, the set of operations comprising:
periodically updating a network service resource list, wherein the network service resource list is an ordered list and indicates at least one feature server accessible via a load balancer;
receiving a registration request from a communication device;
providing the network service resource list to the communication device in response to the registration request, wherein at least one feature server is selected from the ordered list of feature servers;
by the selected feature server:
in response to receipt of a network access request issued by the communication device, determining whether the selected feature server is a home feature server associated with the communication device;
based on a determination that the selected feature server is not the home feature server associated the communication device, determining whether the selected feature server is clustered with the home feature server;
based on a determination that the selected feature server is not clustered with the home feature server, querying the home feature server for the one or more service settings associated with the communication device; and
based on a determination that the selected feature server is clustered with the home feature server, accessing a database communicably coupled to a cluster comprising the home feature server and at least one of a floating feature server and a central feature server, wherein the database identifies one or more service settings associated with the communication device.

14. The system as recited in claim 13, wherein the at least one feature server is selected based at least in part upon a position in the ordered list of feature servers.

15. The system as recited in claim 13, wherein the set of operations further comprises:
based on a determination that the selected feature server is the home feature server associated with the communication device, retrieving the one or more service settings from the database communicably coupled to the home feature server.

* * * * *